(12) United States Patent
Britton et al.

(10) Patent No.: US 7,168,761 B2
(45) Date of Patent: Jan. 30, 2007

(54) CHILD CARRIER FRAME WITH FOLDING SYSTEM

(75) Inventors: Daniel William Britton, Calgary (CA); Imad Assaf, Calgary (CA)

(73) Assignee: 634182 Alberta Ltd., Calgary (CA)

(*) Notice: Subject to any disclaimer, the term of this patent is extended or adjusted under 35 U.S.C. 154(b) by 0 days.

(21) Appl. No.: 10/904,765

(22) Filed: Nov. 26, 2004

(65) Prior Publication Data

US 2005/0110317 A1    May 26, 2005

Related U.S. Application Data

(60) Provisional application No. 60/481,714, filed on Nov. 26, 2003.

(51) Int. Cl.
  *A47D 1/02* (2006.01)
  *A47C 4/00* (2006.01)
(52) U.S. Cl. .................. 297/250.1; 297/16.1; 297/16.2; 297/42; 297/255
(58) Field of Classification Search .............. 297/42, 297/16.1, 16.2, 255
See application file for complete search history.

(56) References Cited

U.S. PATENT DOCUMENTS

| | | | | |
|---|---|---|---|---|
| 379,670 | A | * | 3/1888 | Whitehead ................ 297/42 X |
| 749,915 | A | * | 1/1904 | Buck ........................ 297/42 X |
| 2,592,405 | A | * | 4/1952 | Everest et al. ............... 297/42 |
| 2,733,754 | A | * | 2/1956 | Leslie et al. ............. 297/42 X |
| 2,866,495 | A | * | 12/1958 | Diehl et al. .............. 297/42 X |
| 3,083,050 | A | | 3/1963 | Gill |
| 3,118,553 | A | | 1/1964 | Rosenzweig |
| 3,271,048 | A | | 9/1966 | Beesley |
| 3,276,545 | A | | 10/1966 | D'Angelo |
| 3,312,299 | A | | 4/1967 | Kuecker |
| 3,442,268 | A | | 5/1969 | Symes |
| 3,857,604 | A | | 12/1974 | Scott |
| 3,968,991 | A | * | 7/1976 | Maclaren .................. 297/42 X |
| 4,057,283 | A | | 11/1977 | Barnett |
| 4,243,263 | A | * | 1/1981 | Thiboutot .................... 297/42 |
| 4,249,636 | A | | 2/1981 | Jackson et al. |
| 4,323,133 | A | * | 4/1982 | Williams .................. 297/42 X |
| 4,359,244 | A | * | 11/1982 | Koehm ..................... 297/42 X |
| 4,389,056 | A | * | 6/1983 | Tenniswood .............. 297/42 X |
| 4,415,180 | A | | 11/1983 | Payne, Jr. |
| 4,492,388 | A | | 1/1985 | de Wit |
| 4,493,488 | A | * | 1/1985 | Panaia et al. ............. 297/42 X |
| 4,544,178 | A | | 10/1985 | Al-Sheikh et al. |
| 4,684,149 | A | * | 8/1987 | Meyer ...................... 297/42 X |
| 4,721,320 | A | | 1/1988 | Creps |
| D297,525 | S | | 9/1988 | Baechler |

(Continued)

FOREIGN PATENT DOCUMENTS

CA    461812    12/1949

(Continued)

*Primary Examiner*—Rodney B White
(74) *Attorney, Agent, or Firm*—Bennett Jones LLP

(57) ABSTRACT

A child carrier frame includes a lower frame, an upper frame and a frame support. The frame may be adjusted between an upright position, for use, and a folded position. During folding, the carrier frame may be adjusted both to reduce its height and its width, such that a folded size is obtained that is smaller in at least two dimensions than a similar carrier frame folded to reduce only one of its height and width.

21 Claims, 3 Drawing Sheets

U.S. PATENT DOCUMENTS

| | | | |
|---|---|---|---|
| 4,892,327 A | 1/1990 | Cabagnero | |
| 4,951,782 A | 8/1990 | Hanson | |
| 5,020,814 A | 6/1991 | George | |
| 5,020,816 A * | 6/1991 | Mulholland | 297/42 X |
| 5,110,150 A | 5/1992 | Chen | |
| 5,112,069 A * | 5/1992 | Aldus et al. | 297/42 X |
| 5,176,395 A | 1/1993 | Garforth-Bles | |
| 5,242,178 A | 9/1993 | Galasso | |
| 5,259,634 A | 11/1993 | Berner | |
| 5,301,963 A | 4/1994 | Chen | |
| 5,318,318 A | 6/1994 | Berner | |
| 5,358,263 A * | 10/1994 | Aldus et al. | 297/42 X |
| 5,421,603 A | 6/1995 | Wills et al. | |
| 5,577,746 A | 11/1996 | Britton | |
| 5,725,238 A | 3/1998 | Huang | |
| 5,823,564 A | 10/1998 | Kettler | |
| 5,876,046 A | 3/1999 | Courtney et al. | |
| 5,984,332 A | 11/1999 | Beaudoin et al. | |
| 6,062,587 A | 5/2000 | Cabagnero | |
| 6,062,648 A * | 5/2000 | Adler | 297/42 X |
| 6,099,019 A | 8/2000 | Cheng | |
| 6,155,581 A | 12/2000 | Beaudoin et al. | |
| 6,179,321 B1 | 1/2001 | Sun | |
| 6,209,892 B1 | 4/2001 | Schaaf et al. | |
| 6,241,274 B1 | 6/2001 | Huang | |
| 6,325,406 B1 | 12/2001 | O'Shea et al. | |
| 6,378,892 B1 | 4/2002 | Hsia | |
| 6,626,451 B1 | 9/2003 | Song | |
| 6,698,788 B2 | 3/2004 | Yang | |
| 6,767,028 B2 | 7/2004 | Britton | |
| 6,848,740 B1 * | 2/2005 | Reese | 297/42 X |
| 2002/0014758 A1 | 2/2002 | O'Shea et al. | |
| 2002/0074764 A1 | 6/2002 | Allen et al. | |

FOREIGN PATENT DOCUMENTS

| | | |
|---|---|---|
| CA | 675929 | 12/1963 |
| CA | 1102861 | 6/1981 |

\* cited by examiner

CHILD CARRIER FRAME WITH FOLDING SYSTEM

CROSS REFERENCE TO RELATED APPLICATIONS

This application claims priority to U.S. provisional patent application No. 60/481,714, filed Nov. 26, 2003.

FIELD

The present invention relates to a child carrier frame and in particular to a child carrier frame with a folding system.

BACKGROUND

Child carriers, such as strollers, bicycle trailers, jogging strollers, hiking strollers, etc., often need to be folded for transport and/or for storage. Many child carriers fold only with respect to one of their height or their width. A smaller folded structure could be obtained if a child carrier could be folded both to reduce its height and its width.

SUMMARY OF THE INVENTION

In accordance with a broad aspect of the invention, there is provided a child carrier frame comprising a lower frame including at least a lower left side member and a lower right side member, an upper frame including at least an upper left side member and an upper right side member, a height spacing defined between the lower frame and the upper frame, a width spacing defined between the lower and the upper left side members and their respective right side members, a height adjustment pivotal connection acting between the upper frame and the lower frame to permit at least one of the upper frame and the lower frame to pivot to adjust the height spacing and a width adjustment pivotal connection to permit at least one of the lower left side member and the lower right side member to pivot and at least one of the upper left side member and the upper right side member to pivot to adjust the width spacing and a support frame to support the lower frame and the upper frame and to control pivoting of the height adjustment and the width adjustment pivotal connections.

BRIEF DESCRIPTION OF THE DRAWINGS

In the drawings, various embodiments are shown, in which.

DETAILED DESCRIPTION OF VARIOUS EMBODIMENTS

Figure 1:
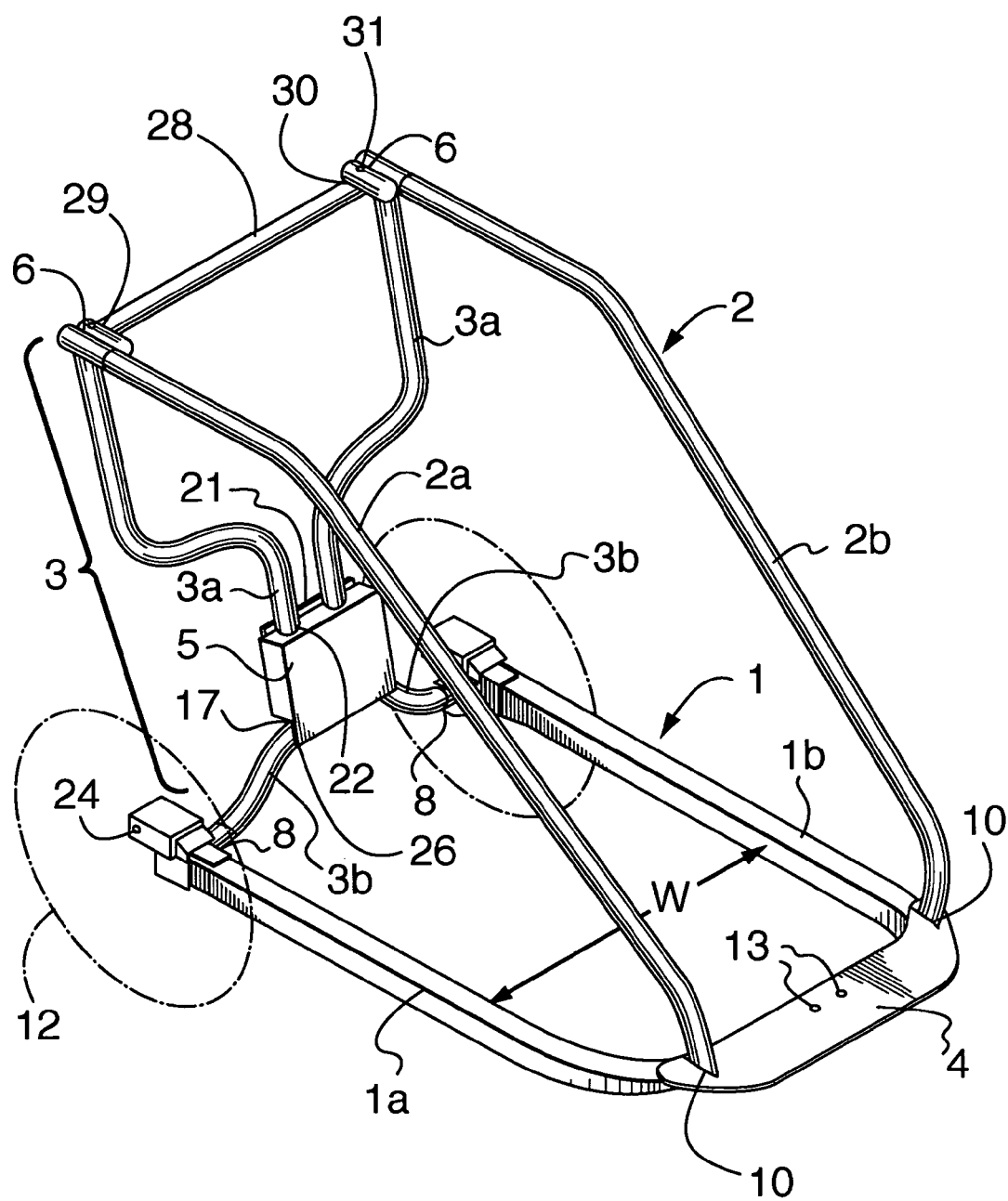
FIG. 1 is a perspective view of a child carrier in an upright position.

A child carrier frame according to the present invention may be adjusted between an upright position, for use, and a folded position. During folding, the carrier frame may be adjusted both to reduce its height and its width, such that a folded size is obtained that is smaller in at least two dimensions than a similar carrier frame folded to reduce only one of its height and width.

A child carrier and child carrier frame according to certain aspects of the present invention have been illustrated in FIGS. 1 to 4. The illustrated carrier and frame are intended to facilitate understanding of the invention, rather than to limit it. As such, it is to be understood that although various features have been shown, alternate embodiments are also possible. Although many such alternates will be described, it is to be understood that other embodiments may be possible.

A child carrier frame according to the present invention includes a lower frame 1, an upper frame 2 and a frame support 3.

Lower frame 1 includes at least a lower left side member 1*a* and a lower right side member 1*b*. Upper frame 2 includes at least an upper left side member 2*a* and an upper right side member 2*b*. These frame members can take various forms, as will be appreciated. Generally, the frame members are formed to define an outer shape of a child carrier and may be bent and formed to support an outer shell of fabric or other sheet materials, not shown herein.

The lower frame and the upper frame may be spaced apart in the frame such that a spacing distance occurs therebetween. Since, in normal use, this spacing between the upper frame and the lower frame may be considered in a substantially vertical direction, the spacing between the lower frame and the upper frame may be referenced as a height spacing H between the lower frame and the upper frame. In the same way, the frame's lower left side member 1*a* may be spaced from lower right side member 1*b* and upper left side member 2*a* may be spaced from upper right side member 2*b* to give the frame a width. Herein, the spacing between the lower members and the spacing between the upper members are collectively referenced as a width spacing W.

Height spacing H and width spacing W can be adjusted, at any particular location along the frame, between a folded height and width (FIGS. 2 and 4) and an upright height and width (FIGS. 1 and 3) by movement of the frame members. One or more height adjustment pivotal connections and one or more width adjustment pivotal connections are provided to act between the frame members to permit the spacing adjustments. In the illustrated embodiment, height adjustment pivotal connections are provided by pivotal connections 10 on upper frame members 2*a*, 2*b*, while the width adjustment pivotal connections may be provided by pivotal connections 10 and/or pivotal connections 13 of the lower frame members 1*a*, 1*b*.

Various pivotal arrangements may be used to act between members 1*a*, 1*b*, 2*a*, 2*b*. For example, the pivotal connections can be made directly or indirectly between the parts and the pivotal connections can be in various forms such as for example of hinges, single pinned connections or universal joints such as dual pinned connections or ball joints, etc.

In the illustrated embodiment, a connector 4 is used as an interface between the upper frame and the lower frame. The connector can be positioned in various configurations, but in the illustrated embodiment is positioned at an end, for example at the front, of the carrier. Connector 4 provides a body onto which the upper and lower frame members are connected, which may simplify and strengthen the pivotal connections and the frame, generally. On the connector, a pivotal connection 13 is provided between an end of each of lower left side member 1*a* and lower right side member 1*b*. Pivotal connections 13 permit rotation of the lower frame members about a substantially vertical axis such that members 1*a*, 1*b* can move toward and away from each other to adjust the spacing therebetween and, thereby, the frame's width spacing. As will be appreciated and as shown, the overall folded width can be reduced by positioning the pivotal connections closer than the upright width spacing distance of the lower members 1a, 1b. The frame members can then be bent out from their pivotal connections to form a desired upright width spacing. In the illustrated embodiment, pivotal connections 13 are formed by pins engaged through the connector and the material of the lower frame members. Connector 4 can include slots 20 into which the lower frame members are connected so that they are supported above and below by material of the connector.

Pivotal connections 10, in the illustrated embodiment, are also provided on connector 4. Pivotal connections 10 may be formed by pinning the ends of each of the upper members 2a, 2b to the connector. Pivotal connections 10 permit rotation of the upper members both (i) toward and away from each other, to adjust the spacing therebetween and thereby the frame's width spacing W, and (ii) toward and away from lower frame 1, to thereby adjust the frame's height spacing H. As will be appreciated, a pivotal connection with such a range of motion can be provided by selection of the orientation of the axis of rotation and/or the shape of the frame member using a single pivot pin at each pivotal connection or by use of a pivotal connection permitting rotation about at least two axes.

Frame support 3 supports the lower frame and the upper frame and includes a positional control to control pivoting of the pivotal connections, to thereby control adjustment of the height and width spacings. Frame support 3 can include one or more separate or connected members that connect in various configurations between the upper and lower frame members. The frame support positional control can include any of various mechanisms such as a length adjustment (i.e. telescoping parts), a folding arrangement (i.e. hinged or pinned connections) or rigid removable cross beams (i.e. disconnectable parts, removable pinned connections, etc.) to permit control of pivoting about pivotal connections 10, 13. Although frame support 3 may provide rigid members between the parts to hold them in a spaced configuration, such rigid members must be removable or collapsible to permit the members 1a, 1b, 2a, 2b to be adjusted for height and or width spacings.

In the illustrated embodiment, frame support 3 is formed as a back frame. The illustrated frame support includes upper region members 3a and lower region members 3b. The upper frame 2 and the upper region members 3a of the frame support are connected by pivotal connections 6. The lower frame 1 and the lower region members 3b of the frame support are connected by pivotal connections 8. The upper region members of the frame support 3a and the lower region members of the frame support 3b are connected by a component 5 that allows the frame support 3 to fold inwardly toward connector 4 with the upper region members and the lower region members coming together. The component 5 can be a hinge, a bracket, a bracketed component that folds over itself, or can accommodate pivotal connection to the upper region members of the frame support 3a and the lower region members of the frame support 3b, etc. In the illustrated embodiment, the upper region members of the frame support 3a and the component 5 are connected by pivotal connections at 15 and the lower region members of the frame support 3b and the component 5 are connected by pivotal connections at 17. The pivotal connections 8, 17 of the lower region members 3b of the frame support permit rotation of the lower frame members about a substantially vertical axis such that members 1a, 1b can move toward and away from each other to adjust the spacing therebetween and thereby the frame's width spacing. The pivotal connections 6, 15 at either ends of the upper region members 3a of the frame support permit rotation of the upper members both (i) toward and away from each other, to adjust the spacing therebetween and thereby the frame's width spacing W, and (ii) toward and away from lower frame 1, the thereby adjust the frame's height spacing H. As will be appreciated, a pivotal connection with such a range of motion as described with respect to connections 6, 15, 17 and 8 can be provided by selection of the orientation of the axis of rotation and/or the shape of the frame member using a single pivot pin at each pivotal connection or by use of a pivotal connection permitting rotation about at least two axis. In the illustrated embodiment, it has been found that the frame folding is facilitated by provision of a universal joint, such as a ball and socket joint, at pivotal connections 6.

Component 5 can be formed to prevent over-rotation about pivotal connections 15 and 17, if desired. For example, slots 22 can be formed for retaining upper region members 3a wherein the back of the slot creates a stop limiting the rotation of members 3a about their pivotal connections. In addition or alternately, stop walls 26 can be extended adjacent connections 17.

In the illustrated embodiment, the frame support 3 is folding X-shaped configuration with all members connected into component 5 but other folding frame support configurations can be used, as desired.

In order to provide greater rigidity and/or strength to the frame, it may be desirable to provide more than one frame support. In the illustrated embodiment of FIG. 1, for example, the upper frame may require reinforcement and a substantially rigid cross beam 28 may be installed to extend between upper frame members 2a, 2b, as shown, or upper region members 3a to provide such reinforcement. Cross beam 28 can be secured in various ways to function to reinforce the frame. However, as will be appreciated, the cross beam generally is removable or moveable to permit folding of the frame. For example, cross beam 28 may be pivotally connected to the frame on one side 29 and fastened on its opposite end 30, as by use of an unlockable pin 31, so that it is secured connected between the sides of the frame but can be removed and pivoted out of the way to permit folding.

The illustrated frame, including many pivotal connections may include a locking arrangement to maintain the frame in an upright configuration. Some locking arrangements may include a lock at one of the pivotal connections, such as a lock pin extending through alignable apertures, an over center arrangement, gates, cross beams, etc. In one embodiment, a lock gate 21 can be removably positioned over slots 22 into which upper region members 3a are positioned when in the upright position. As such, members 3a cannot move out of slots 22 until the gate is opened.

The frame may be constructed of any suitable materials, such as wood, steel, plastic, aluminum, and so on.

The frame may include a seat (not shown), which is often slung between several of the frame members.

The frame may include components to accept transport means. For example, axle brackets 24 may be provided to retain wheels 12, skis or other means. Further components may also be provided, such as would accept further wheels or skis, a front single wheel, a handle, a hitch arm, etc. In particular, although the carrier in FIG. 1 is illustrated with two wheels as in preparation for towing, other carrier configurations are possible including a three or more wheeled strollers, trailers, side carriers, ski or hiking trailers, etc.

From an upright position, the carrier may be folded by releasing or removing any members that hold the parts in a spaced configuration, such as frame supports, locks, etc. and urging the height spacing and/or width spacing between members 1a, 1b, 2a, 2b to be reduced, for example by moving the members together.

Figure 2:
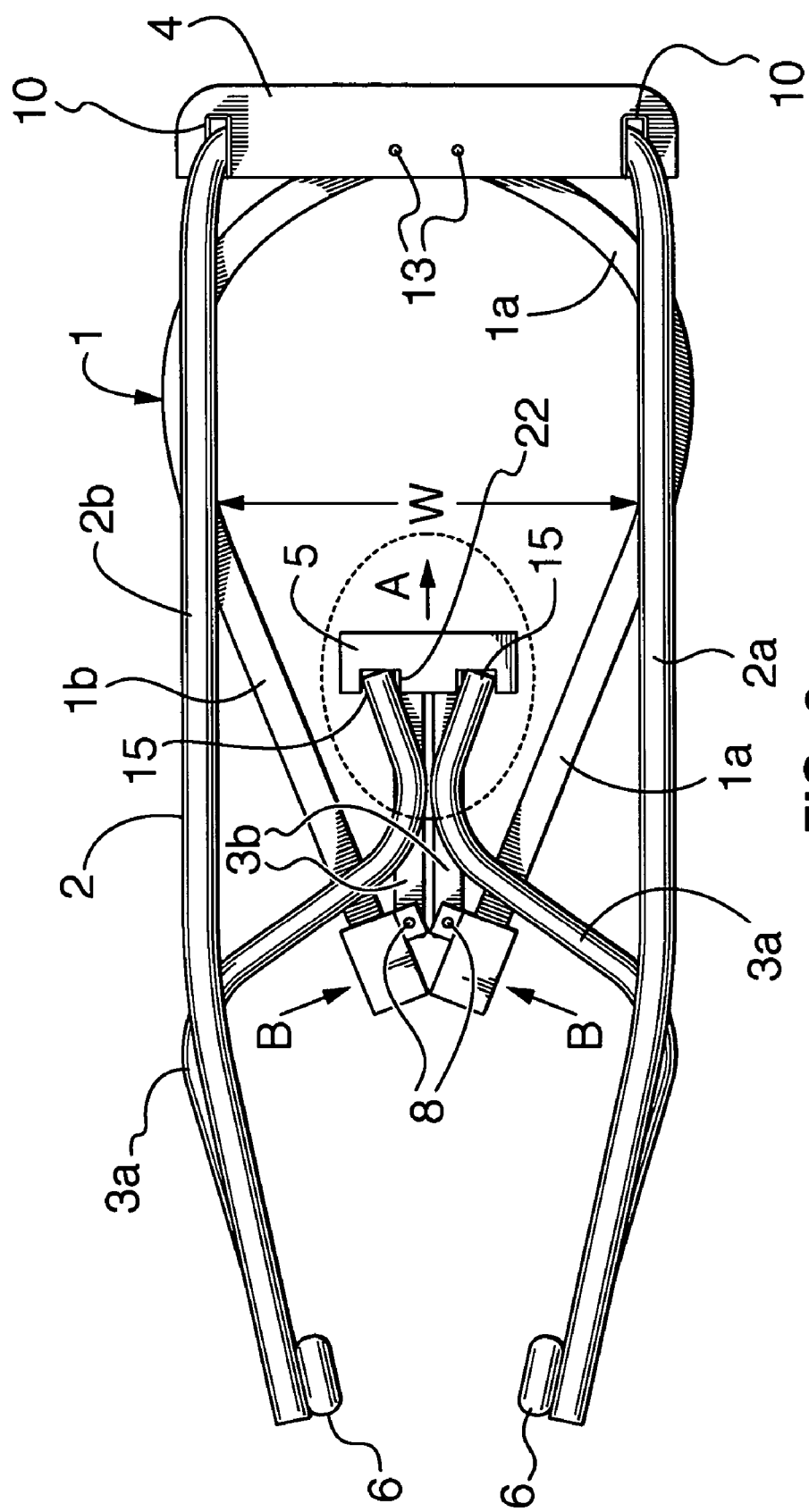
FIG. 2 is a top plan view of a child carrier frame in a folded position.
Figure 3:
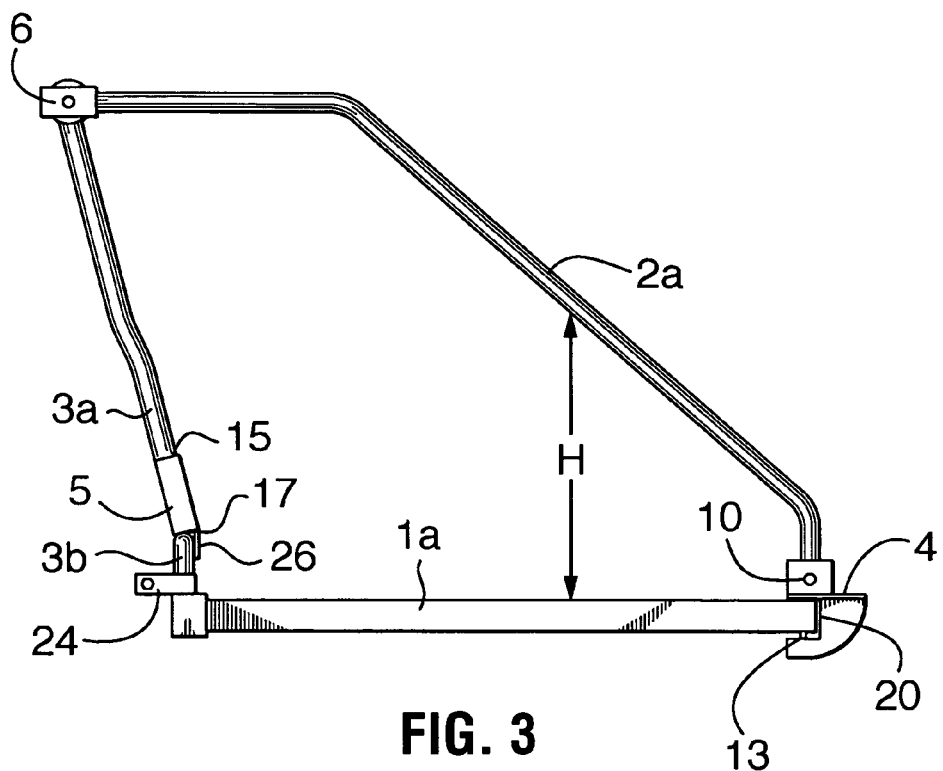
FIG. 3 is a side elevation of the child carrier frame of FIG. 2 in an upright position.
Figure 4:
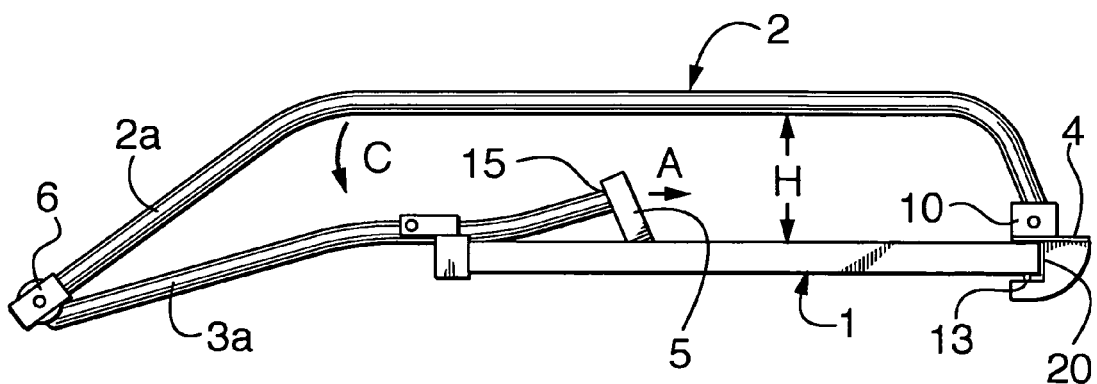
FIG. 4 is a side elevation of the child carrier frame of FIG. 2.

This can be done, in the illustrated embodiment, by releasing any locking arrangement, such as by removing opening gate 21, in the embodiments of FIGS. 1 and 2 and additionally in the embodiment of FIG. 1, unlocking and pivoting cross beam 28. Then folding can proceed by pushing the upper frame 2 down towards the lower frame 1. When a frame support as shown is used with a center component 5, folding can alternately proceed after unlocking by collapsing the frame support about component 5. As demonstrated within the circle in FIG. 2 the upper region members 3a and the lower region members 3b can be folded together by pivoting the frame support inwardly, arrow A, at the component 5, with the component 5 moving forwardly toward the connector 4. In so doing, folding of the upper and the lower region members of the frame support is accomplished through the connections at 6, 8, 15 and 17. This action draws the members 1a, 1b, 2a, 2b inwardly, arrows B and C, toward each other as permitted by connections 10 and 13. As a result, the carrier can be folded to reduce its width in addition to its height. As will be appreciated, a folding operation can proceed by one movement, which includes moving component 5 forward relative to the upper and lower frame members.

Unfolding of the illustrated trailer can also proceed in one step, by pulling the component 5 back away from connector 4. This motion drives the parts to upright about the pivotal connections 6, 8, 15, 17, 10 and 13.

It is to be understood that even though certain characteristics of the present invention have been set forth in the foregoing description, the description is illustrative only, and changes may be made without departing from the principles of the invention.

What is claimed is:

1. A child carrier frame comprising a lower frame including at least a lower left side member and a lower right side member, an upper frame including at least an upper left side member and an upper right side member, a height spacing defined between the lower frame and the upper frame, a width spacing defined between the lower and the upper left side members and their respective right side members, a height adjustment pivotal connection acting between the upper frame and the lower frame to permit at least one of the upper frame and the lower frame to pivot to adjust the height spacing and a width adjustment pivotal connection to permit at least one of the lower left side member and the lower right side member to pivot and at least one of the upper left side member and the upper right side member to pivot to adjust the width spacing and a frame support to support the lower frame and the upper frame and to control pivoting of the height adjustment and the width adjustment pivotal connections, the frame support is selected such that movement thereof inwardly between the upper frame and the lower frame drives both a reduction in height spacing and a reduction in width spacing.

2. The child carrier frame of claim 1 wherein the frame support includes a collapsible frame between the lower left side member and the lower right side member.

3. The child carrier frame of claim 1 wherein the frame support includes a collapsible frame between the upper left side member and the upper right side member.

4. The child carrier frame of claim 1 wherein the frame support includes a collapsible frame pivotally connected to the lower left side member, the lower right side member, the upper left side member and the upper right side member.

5. The child carrier frame of claim 4 wherein the collapsible frame includes pivotal connections to the lower left side member, the lower right side member, the upper left side member and the upper right side member at least some of which permit rotation about at least two axis axes.

6. The child carrier frame of claim 4 wherein the collapsible frame includes a center component, upper region members pivotally connected between the upper frame and the center component, lower region members pivotally connected between the lower frame and the center component.

7. The child carrier frame of claim 6 wherein the center component is connected such that movement thereof drives rotation about both the width adjustment pivotal connection and the height adjustment pivotal connection.

8. The child carrier frame of claim 6 wherein the frame support prevents over-rotation between the center component and the upper region members and prevents over-rotation between the center component and the lower region members such that a reduction in height spacing and a reduction in width spacing is achieved only by moving the center component forwardly between the upper frame and the lower frame.

9. The child carrier frame of claim 1 further comprising a connector connected between the upper frame and the lower frame and on which the height adjustment pivotal connection and the width adjustment pivotal connection are positioned.

10. The child carrier frame of claim 9 wherein the connector is positioned at a forward end of the frame.

11. The child carrier frame of claim 9 wherein the height adjustment pivotal connection includes an upper pivotal connection between the connector and the upper left side member and an upper pivotal connection between the connector and the upper right side member and the upper pivotal connections permit the upper frame to be folded down towards the lower frame.

12. The child carrier frame of claim 11 wherein the width adjustment pivotal connection includes a lower pivotal connection between the connector and the lower left side member and a lower pivotal connection between the connector and the lower right side member and the lower pivotal connections selected to permit the lower left side member and the lower right side member to be moved toward and away from each other.

13. The child carrier frame of claim 12 wherein the width adjustment pivotal connection further includes the upper pivotal connections further selected to permit the upper left side member and the upper right side member to be moved toward and away from each other.

14. The child carrier frame of claim 1 wherein the frame support includes a pivotal connection permitting rotation about at least two axes.

15. The child carrier frame of claim 14 wherein the pivotal connection permitting rotation in at least two axes is a universal joint between the frame support and the upper frame.

16. A child carrier frame comprising a lower frame including at least a lower left side member and a lower right side member, an upper frame including at least an upper left side member and an upper right side member, a height spacing defined between the lower frame and the upper frame, a width spacing defined between the lower and the upper left side members and their respective right side members, a height adjustment pivotal connection acting between the upper frame and the lower frame to permit at least one of the upper frame and the lower frame to pivot to adjust the height spacing and a width adjustment pivotal connection to permit at least one of the lower left side member and the lower right side member to pivot and at least one of the upper left side member and the upper right side member to pivot to adjust the width spacing and a frame support to support the lower frame and the upper frame and to control pivoting of the height adjustment and the width adjustment pivotal connections, the frame support including a pivotal connection permitting rotation about at least two axes and wherein the pivotal connection permitting rotation in at least two axes is a universal joint between the frame support and the upper frame.

17. The child carrier frame of claim 16 wherein the frame support includes a collapsible frame between at least one of (a) the lower left side member and the lower right side member and (b) the upper left side member and the upper right side member.

18. The child carrier frame of claim 16 wherein the frame support includes a collapsible frame pivotally connected to the lower left side member, the lower right side member, the upper left side member and the upper right side member.

19. The child carrier frame of claim 18 wherein the collapsible frame includes a center component, upper region members pivotally connected between the upper frame and the center component, lower region members pivotally connected between the lower frame and the center component.

20. A child carrier frame comprising a lower frame including at least a lower left side member and a lower right side member, an upper frame including at least an upper left side member and an upper right side member, a height spacing defined between the lower frame and the upper frame, a width spacing defined between the lower and the upper left side members and their respective right side members, a height adjustment pivotal connection acting between the upper frame and the lower frame to permit at least one of the upper frame and the lower frame to pivot to adjust the height spacing and a width adjustment pivotal connection to permit at least one of the lower left side member and the lower right side member to pivot and at least one of the upper left side member and the upper right side member to pivot to adjust the width spacing and a frame support to support the lower frame and the upper frame and to control pivoting of the height adjustment and the width adjustment pivotal connections, the frame support including a collapsible frame pivotally connected to the lower left side member, the lower right side member, the upper left side member and the upper right side member and including a center component, upper region members pivotally connected between the upper frame and the center component, lower region members pivotally connected between the lower frame and the center component and wherein the center component is connected such that movement thereof drives rotation about both the width adjustment pivotal connection and the height adjustment pivotal connection.

21. A child carrier frame comprising a lower frame including at least a lower left side member and a lower right side member, an upper frame including at least an upper left side member and an upper right side member, a height spacing defined between the lower frame and the upper frame, a width spacing defined between the lower and the upper left side members and their respective right side members, a height adjustment pivotal connection acting between the upper frame and the lower frame to permit at least one of the upper frame and the lower frame to pivot to adjust the height spacing and a width adjustment pivotal connection to permit at least one of the lower left side member and the lower right side member to pivot and at least one of the upper left side member and the upper right side member to pivot to adjust the width spacing and a frame support to support the lower frame and the upper frame and to control pivoting of the height adjustment and the width adjustment pivotal connections, the frame support including a collapsible frame pivotally connected to the lower left side member, the lower right side member, the upper left side member and the upper right side member and including a center component, upper region members pivotally connected between the upper frame and the center component and lower region members pivotally connected between the lower frame and the center component and wherein the frame support prevents over-rotation between the center component and the upper region members and prevents over-rotation between the center component and the lower region members such that a reduction in height spacing and a reduction in width spacing can be achieved only by moving the center component forwardly between the upper frame and the lower frame.

* * * * *